Jan. 26, 1960    B. A. FLEENOR    2,922,498
GASEOUS PRESSURE PRODUCING DEVICE
Filed Nov. 30, 1956    2 Sheets-Sheet 1

INVENTOR.
BERT A. FLEENOR
BY
Horace B. VanValkenburgh
ATTORNEY

Jan. 26, 1960     B. A. FLEENOR     2,922,498
GASEOUS PRESSURE PRODUCING DEVICE
Filed Nov. 30, 1956                 2 Sheets-Sheet 2

INVENTOR.
BERT A. FLEENOR
BY
Horace B. Van Valkenburgh
ATTORNEY

United States Patent Office 2,922,498
Patented Jan. 26, 1960

2,922,498

GASEOUS PRESSURE PRODUCING DEVICE

Bert A. Fleenor, Englewood, Colo., assignor of one-half to La Vere A. Hiteman, Denver, Colo.

Application November 30, 1956, Serial No. 625,500

15 Claims. (Cl. 188—106)

This invention relates to gas pressure producing devices, particularly to such devices which may be used as emergency brake applying apparatus, and more particularly to such devices which may be used to apply the brakes of a truck or the like when for some reason the air under pressure normally supplied to the brakes should fail.

Trucks and truck transports, particularly when fully loaded, usually involve a large amount of weight which requires the production of braking forces of considerable magnitude in order to slow down or to stop such a truck or truck transport. Particularly when going down hill, brake failure may often result in serious property damage, as well as loss of life. Such brake failures are more commonly due to a breakage of the line which supplies air to the brakes, although sometimes due to leakage from the air supply tank or reservoir, since the air pressure necessary to supply an adequate braking force to slow down or stop a truck weighing many tons is comparatively high, such as on the order of 75 to 100 pounds per square inch. Manually applied emergency braking devices normally do not produce a sufficient braking force; also, considerable time is often required to apply a manual device so that an effective braking effect will be produced, but by that time the situation may be beyond control.

Among the objects of the present invention are to provide a novel gas pressure producing device; to provide such a device which is particularly adapted to be used as an emergency device for applying brakes; to provide such a device which will be effective, irrespective of the time elapsed after installation; to provide such a device which will insure that suitable gas pressure to a brake cylinder is provided and flow through an air line which may be broken or leaking is prevented; to provide such a device which may include combustible material which provides the desired pressure of gaseous combustion products, but which is protected against deterioration from the moisture normally present in brake air lines; to provide such a device which may be readily installed; to provide such a device which may be readily replaced after use; to provide such a device which effectively locks the brakes, but which will permit the brakes later to be released without danger; and to provide such a device which is sufficiently simple in construction that it may be readily manufactured.

Additional objects of this invention, together with the novel features thereof, will become apparent from the description which follows, taken in connection with the accompanying drawings, in which.

Figures 1, 2:
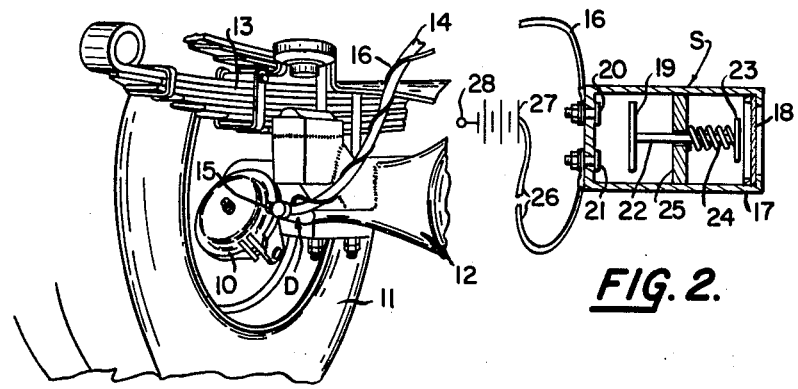
Fig. 1 is a fragmentary, perspective view of a portion of a wheel and associated parts of a truck or the like provided with an emergency gaseous pressure producing device, constructed in accordance with this invention.
Fig. 2 is a longitudinal section of a switch which may be mounted in the cab of the truck of Fig. 1 for use in actuating the device thereof, showing also diagrammatically a battery to which the switch may be connected.

As illustrated in Fig. 1, a gaseous pressure producing device D, constructed in accordance with this invention, may be installed on an air brake cylinder 10 adapted to apply the brake for a wheel 11 of a truck or the like, having also a rear axle 12 and a spring 13. Normally, an air line 14 is connected directly to the air brake cylinder 10, but the device D is readily installed by disconnecting the air line 14 from the cylinder 10, connecting it to the device D and connecting the device D to the air brake cylinder 10, as by a nipple 15. To complete the installation, it is necessary only to connect to the device D an electrical wire 16, which may conveniently be wound about the air line 14 for a convenient distance, so that the wire 16 may be connected to a switch S of Fig. 2, which is preferably mounted on the dashboard or any other position convenient for the driver, since the use of the device of this invention normally involves an emergency situation and the switch S should be actuable by the driver without any delay. The switch S may be constructed in any suitable manner, such as including a cylindrical housing 17, conveniently formed of electrically non-conductive material and provided at its front end with a breakable, transparent plate 18, such as of glass, to prevent accidental closing of the switch but to permit fast closing of the switch when an emergency arises. Switch S may include a switch plate 19 adapted to be pushed against contacts 20 and 21, conveniently mounted at the rear of the housing, to close the circuit through the switch, plate 19 being conveniently mounted on a rod 22 formed of electrically non-conductive material and provided with a push button 23 at its opposite or outer end for actuation. The switch plate 19 may be held in open position by a spring 24 bearing between button 23 and a flange 25, attached to the inside of housing 17 and having a central hole through which rod 22 extends. Electrical wire 16 may be connected to contact 20, while contact 21 may be connected, as by a wire 26, with a suitable source of current, such as one terminal of a battery 27, the opposite terminal of which is connected to a ground 28, in a conventional manner, as on the frame of the truck. The truck frame and other metal parts leading to the air brake cylinder 10 and thence to the device D, form a ground connection to the battery to complete the circuit. The opposite end of wire 16 is connected to a suitable ignition device, such as a plug P of Fig. 3, which may be a so-called "glow plug," ordinarily used in model airplanes and the like for ignition purposes. Although such a plug ordinarily requires only 1½ volts, while a truck battery may normally supply a higher voltage, such as 6 or 12 volts, such higher voltage is not disadvantageous since the plug P is ordinarily used only once. However, if a lower voltage is desired, it can be supplied in any conventional manner. It will be understood, of course, that other types of switches can be utilized.

Figure 3:
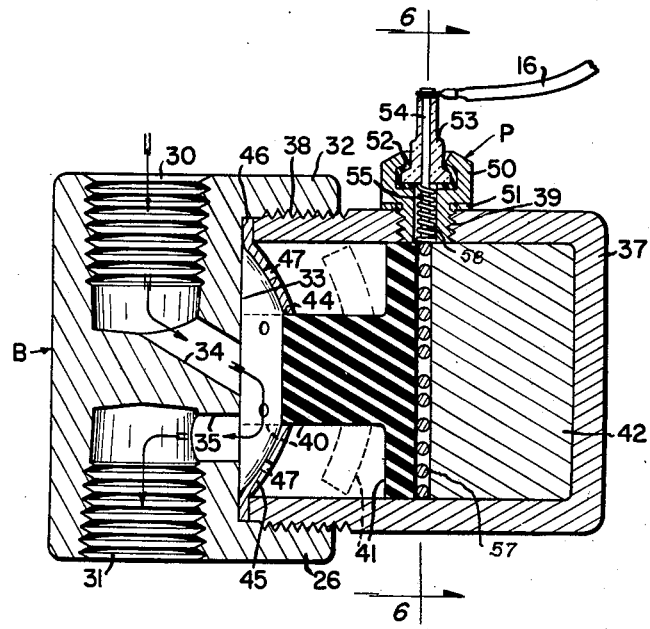
Fig. 3 is an enlarged axial section of the device of Fig. 1.

As illustrated in Fig. 3, a gaseous pressure producing device D, constructed in accordance with this invention, may comprise a body B having an interiorly threaded inlet 30 at one side, an interiorly threaded outlet 31 at the opposite side and at one end an annular flange 32, conveniently threaded on the inside and forming a circular well having a bottom 33. Body B may also be provided with a passage 34 extending from inlet 30 to the center of well bottom 33, and a passage 35 extending to outlet 31 from a position offset from the center of well bottom 33. It will be understood, of course, that the passages 34 and 35 may extend to well bottom 33 at any other desired positions, as long as the two are offset or spaced from each other. The conventional threaded connection at the end of air line 16 is adapted to be connected to inlet 30 of body B, while outlet 31 thereof is adapted to be connected to the air brake cylinder 10 by nipple 15 of Fig. 1.

The device D may also include a cylinder 37, closed at one end and provided with exterior threads 38 at its opposite, open end, for threaded engagement with the interior threads of flange 32, and also provided with a threaded hole 39 in one side for receiving ignition plug P. Cylinder 37 may enclose a seal plug 40, which may be formed of a flexible material, such as a rubber or plastic adapted to resist heat, and provided with a lateral flange 41 which engages the inner wall of cylinder 37. Between plug 40 and the closed end of cylinder 37 may be disposed combustible material 42 which is adapted to produce a comparatively large amount of gaseous products of combustion in a manner similar to explosives, but which is slower burning than normal explosives, such as dynamite, and therefore will not tend to fracture cylinder 37 when it burns. The combustible material 42 may be a solid block or disc of a size adapted merely to be placed within cylinder 37, or may be granular material which is poured into the cylinder 37. A suitable material for this purpose may be a modified dynamite or black powder, or a material such as disclosed in U.S. Patent 1,493,347, or may be the "Jetex" slow burning fuel, manufactured by Imperial Chemical Industries, Ltd. A commercial laboratory analysis of "Jetex" indicates that the principal constituent is a guanidine derivative, the total nitrogen content being about 41%, with a small amount of a cellulose product present, apparently paper or wood pulp, as well as a small amount of sodium and potassium, apparently as the nitrate. Neither chlorine, ammonia as such, nor phosphates or sulfate were found, while the ash content found, i.e., about 1%, indicated that there was little inorganic filler.

Figure 4:
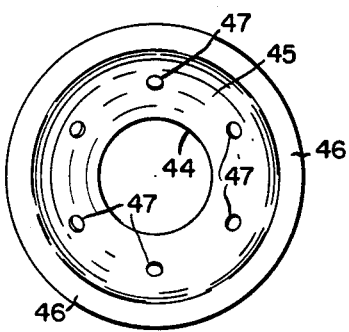
Fig. 4 is a front elevation of a disc forming part of the apparatus of Fig. 3.

The normal position of plug 40 is shown in full in Fig. 3, i.e., spaced from the well bottom 33 and the passage 34, so that the normal flow of air through air line 16 to the brake cylinder 10 may take place along the path indicated by the arrows of Fig. 3. However, when the material 42 ignites, the gas pressure developed moves the plug 40 to the dotted position of Fig. 3, in which the passage 34 is sealed off, to prevent the flow of gas into inlet 30 and thence back into the air line 16 with the possibility of loss of pressure, as through the same leak or break which caused the brakes to fail to respond when an attempt was made to apply them in the usual manner. Also, when material 42 ignites and the plug 40 is moved against the well bottom 33 to seal passage 34, the flange 41 will bend, as to the dotted position of Fig. 3, so that the gas will flow between the edge of the flange 41 and the inner wall of cylinder 37 and thence through the passage 35 and outlet 31 to the air brake cylinder 10, thus applying the brakes. The plug 40 may be guided in such movement by a central aperture 44 in a dished plate 45, shown also in Fig. 4 and having a peripheral flange 46 which may be clamped against the well bottom 33 by the end of cylinder 37, for sealing purposes. Plate 45 may also be provided with a series of holes 47 which permit the gas or gaseous products of combustion to pass through plate 44 and thereby reach passage 35 and thence the air brake cylinder 10. The flange 41 of plug 40, which preferably engages the inside of cylinder 37, also seals the combustible material 42 from moisture normally present in air lines and thereby prevents deterioration of the material 42, particularly during periods of non-use which may sometimes be extensive.

Figure 5:
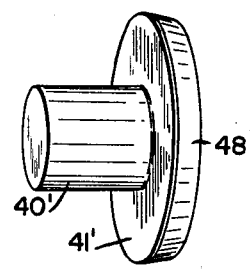
Fig. 5 is a perspective view of a sealing plug, slightly modified from a plug which forms a part of the device of Fig. 3.
Figure 8:
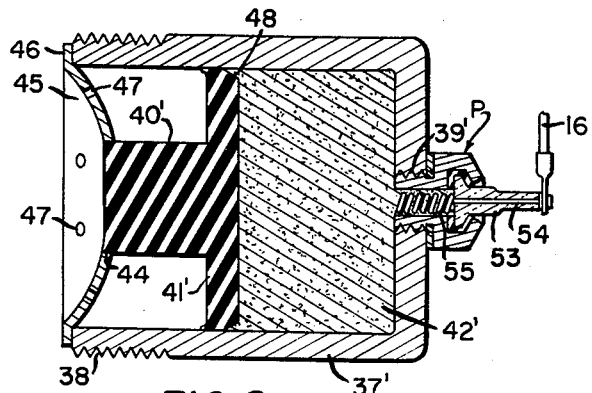
Fig. 8 is an axial section of a cylinder and associated parts, alternative to similar parts of Fig. 3.

The seal plug 40 may be modified, as in the case of seal plug 40', shown in Figs. 5 and 8 and having a flange 41', the peripheral edge 48 of which may be beveled, as shown, to provide a larger annular area for flow of gases therearound when bent to the dotted position of flange 41 of Fig. 3, as well as a more resilient seal, as in Fig. 8. Thus, the outer diameter of edge 48 may be slightly greater than the inner diameter of cylinder 37, so as to form a more effective seal against the entrance of moisture to the combustible material 42, as well as to provide frictional resistance against displacement of the plug, as from road jars and the like.

Figure 6:
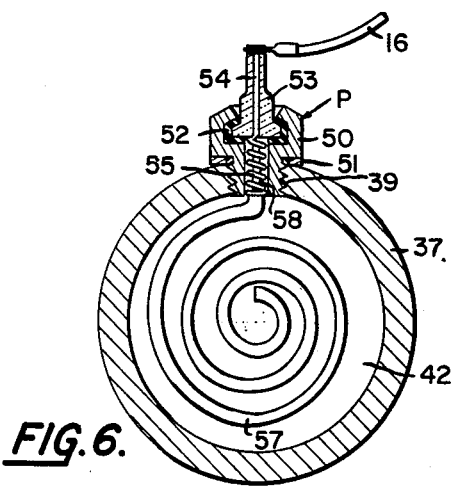
Fig. 6 is a cross section, taken along line 6—6 of Fig. 3.
Figure 7:
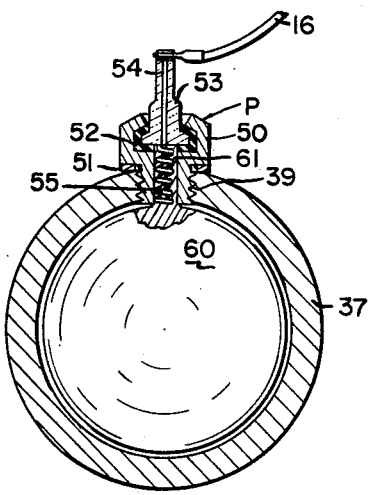
Fig. 7 is a cross section, similar to Fig. 6, but illustrating a modification thereof.

As illustrated in Fig. 6, the ignition plug P may be conventional in construction, such as including a housing 50 threaded at one end and adapted to clamp a gasket 51 against the outside of cylinder 37 and provided with a chamber at the opposite end adapted to receive packing 52 for an insulator 53 in which a heating element or wire 54 is embedded. Wire 54 may extend through insulator 53 and form a coil 55, the opposite end of which may be soldered, brazed or otherwise attached, to provide a suitable electrical connection, to the inner end of housing 50. The combustible material 42 may be ignited by suitable fuse material, such as provided in the form of a wire 57, the outer end 58 of which extends within the coil 55 and the remainder of which may be coiled flat in the space between the seal plug 40 and combustible material 42, as is also shown in Fig. 6. Or, as illustrated in Fig. 7, the fuse material may be formed as a thin cylindrical block 60 having a tongue 61 which is poured into the space within and around coil 55, so as to insure maximum contact with the ignition coil 55 with resultant speed of ignition of the fuse material. When the latter form of fuse is used, it may be desirable to provide a cap to form the closed end of cylinder 37, so that the fuse block 60 may be more readily poured in situ, with the plug P in place. The fuse material, such as wire 57 of Fig. 6 or block 60 of Fig. 7, may be any suitable granular or solid material.

When the combustible material 42 is in granular or other relatively finely divided form, such as the material 42' of Fig. 8, the fuse material may be dispensed with, particularly if the ignition plug P is disposed in the bottom of the container for the combustible material, such as the cylinder 37' of Fig. 8 which is similar to cylinder 37 of Fig. 3, except that a hole 39' to receive plug P is placed in the end, rather than in the side wall. Also, the device D is preferably attached to the brake cylinder 10, as by the nipple 15 of Fig. 1, so that the cylinder 37' will hang downwardly and the granular combustible material 42' will tend to be packed more tightly about coil 55 of the ignition wire 54 from road shocks or jars. Of course, cylinder 37' may be vibrated or jarred when the granular combustible material 42' is placed therein, so that the granules will tend to pack about the coil 55 prior to installation. As will also be evident, whenever the brakes are applied and air pressure is introduced in the upper end of cylinder 37', the plug 40' and its flange 41' will be pressed downwardly against the granular material 42', which thus tends to remain in a tightly packed condition, thereby facilitating the ignition and complete combustion of the material 42'. In any event, when packed closely or relatively tightly about coil 55, the combustible material 42' will be ignited when the ignition wire coil 55 becomes heated when the switch S of Fig 2 is closed.

The amount of combustible material 42 or 42' should be sufficient that the products of combustion will fill the cylinder 37, the passages leading to the air brake cylinder 10 and also the air chamber of cylinder 10 and develop a suitable pressure, such as approximately 90 to 100 pounds per square inch. If desired, for smaller sizes of air brake cylinders, requiring a lesser volume of gaseous products of combustion, a smaller block of material 42 may be utilized, and a smaller size cylinder 37 or 37' may be used or the same size cylinder may be used and the space unoccupied by the material 42 or 42' replaced by a neoprene backing disc or the like. Tests have shown that a disc of "Jetex" slow burning fuel having a diameter of 1 in. and a thickness of 9/16 in. would produce sufficient pressure to apply adequately the brake for a 10 in. brake cylinder, while a disc having a similar diameter but only 5/16 in. thick was found sufficient for a 5 in. diameter air brake cylinder.

A device D of this invention is preferably provided for each air brake cylinder, so that each brake will be applied to substantially the same degree. As will be evident, when switch S of Fig. 2 is closed, current will immediately flow to each of the ignition plugs P, causing the fuse material, such as wire 57 of Fig. 6 or block 60 of Fig. 7, to ignite, thereby setting off the combustible material 42, or the combustible material 42' of Fig. 8 to be ignited directly. This will cause the brakes to be set, and while the truck or the like cannot be moved until the brakes are released, this is desirable, since the truck or the like is immediately stopped, such as a matter of a few seconds. As a matter of fact, a truck and trailer having a gross weight of 16,000 lbs., has been stopped in 10 seconds from a speed of 30 m.p.h. by use of the device of this invention on the trailer brakes only. After the truck or the like has been stopped, it is desirable that repairs be made before the truck or the like is moved again, so that air pressure may again be applied to the brakes. After the air line breakage or leak causing the failure has been repaired, the brakes may be released without danger, merely by unscrewing the ignition plug P. After the pressure in the cylinder 37 or 37' has been released, the pressure within air cylinder 10 will tend to move plug 40 or 40' back into the cylinder and thus uncover passage 34, thus permitting the pressure in the cylinder to be relieved by flow into the air line 16, for release in the same manner as pressure is released when the brakes are released in the ordinary manner, or to flow past flange 41 and out hole 39. In any event, even if passage 34 is covered, the application of air pressure through inlet 30 will force the plug 40 away from the end of passage 34 at any time the brakes are applied normally. Since hole 39 would tend to leak air, if the device D is not replaced, before the truck is driven again, the ignition plug P should be replaced after the pressure has been released. Thus, if a new set of devices D is not carried in the truck or the like, the truck may then be driven to a point at which such replacement can be secured and which may then be installed. As will be evident, initial installation is quite simple, since it is necessary only to disconnect air line 16 from the brake cylinder 10 and connect the device D in the air line at the cylinder 10.

The device D may be manufactured economically, since the body B may be formed by casting of suitable metal, such as aluminum, and the cylinder 37 or 37' may be an extrusion, such as aluminum. The plate 45 may be stamped from a suitable metal, and need not be particularly strong since hole 44 acts only to guide plug 40 and flanges 46 are used only for sealing and positioning purposes. The plug 40 may be molded from rubber or other suitable material, while the ignition plugs P or other suitable ignition plugs, may be purchased at a reasonable price on the open market.

Additional variations, other than those indicated, may also be made in the device of this invention. For instance, the passage 34 need not terminate in the center of the well bottom 33, but if the end of passage 34 is offset from center, then the plug 40 should be similarly offset, relative to the center of cylinder 37, with a corresponding change in the position of guide hole 44 in plate 45. Also, the inwardly extending portion of plug 40 need not be cylindrical in shape, but may have any other desired cross-sectional shape, while the dished plate 45 may have other configurations. In addition, a guide for the plug may be formed by a flange formed integrally with the cylinder 37, although a separate guide plate for the plug may be made more economically. The fuse material may also be used in other forms or configurations, while the combustible material 42 or 42' may be suitable material other than those indicated specifically, and other types of ignition plugs may be used.

As will be evident, a gaseous pressure producing device constructed in accordance with this invention fulfills to a marked degree the requirements and objects hereinbefore set forth. The device is particularly adapted to be utilized as an emergency device for applying the brakes of a truck or the like and will be effective, irrespective of time elapsed after installation, since the combustible material is adequately sealed against the effects of moisture or other elements which might cause deterioration, by means of the seal provided against the inside of cylinder 37 by the flange 41 of plug 40, or variations thereof indicated. Since upon actuation, the plug 40 seals off the inlet connection for the air line, no loss through the leak or break which caused the brake failure in the first instance will occur. Also, due to the small diameter of the threaded end of the ignition plug P, and further due to the fact that the plug P may be loosened sufficiently to relieve the pressure within the device and within the brake cylinder without complete removal, the brakes may be released at an appropriate time without undue difficulty or danger.

Although a preferred embodiment of this invention, and certain variations thereof have been illustrated and described, it will be understood that other embodiments may exist and that various other changes may be made, all without dpearting from the spirit and scope of this invention.

What is claimed is:

1. A gaseous pressure producing device comprising a body having an inlet and an adjacent but separate outlet, a well spaced from each of said inlet and outlet, a first passage leading from said inlet to said well and a second passage leading from said well, at a point spaced from said first passage, to said outlet; a housing attached to said body at said well and enclosing combustible material; means for igniting said combustible material; and a sealing plug normally spaced from the end of said first passage in said well but movable by gaseous pressure developed by ignition of said combustible material toward and into sealing relation with said end of said first passage, said plug being formed of resilient material and being constructed and arranged to permit flow of the gaseous products of combustion of said material through said second passage, said plug being provided with a laterally extending flange at the end opposite said sealing end, said flange engaging the inner periphery of said housing to provide a seal for said combustible material, but being adapted to bend to permit the flow of gaseous products of combustion past said flange when said combustible material is ignited.

2. A device as defined in claim 1, wherein said flange is provided with a bevel edge.

3. A device as defined in claim 2, including means for guiding said plug in its movement toward said end of said first passage.

4. A gaseous pressure producing device comprising a body having an inlet and a separate outlet, a well spaced from each of said inlet and outlet, a first passage leading from said inlet to said well and a second passage leading from said well, at a point spaced from said first passage, to said outlet; a housing attached to said body at said well and enclosing combustible material; means for igniting said combustible material; a sealing plug having an end normally spaced from the end of said first passage in said well but movable by gaseous pressure developed by ignition of said combustible material toward and into sealing relation with said end of said first passage, said end of said plug which seals said first passage being smaller than said well so as to permit flow of the gaseous products of combustion of said material through said second passage, said plug being formed of resilient material and provided with a laterally extending flange at the end opposite said sealing end, said flange engaging the inner periphery of said housing to provide a seal for said combustible material but being adapted to bend and permit the flow of gaseous products of combustion past said flange when said combustible material is ignited; and means having an aperture for guiding said sealing end of said plug toward said end of said first passage.

5. A device as defined in claim 4, wherein said well, said housing, and said sealing end of said plug are each cylindrical.

6. A device as defined in claim 5, wherein said guide means comprises a dish shaped plate having a central aperture for guiding said sealing end of said plug, a flange clamped by said housing in said well and a plurality of apertures between said central aperture and said flange.

7. A device as defined in claim 4, wherein said means for igniting said combustible material includes an ignition device including a wire adapted to become heated upon the passage of electricity therethrough, and fuse material contacting said wire and extending to a position between said combustible material and said sealing plug.

8. A device for applying an air brake of a truck or the like, such air brake including a brake cylinder and an air line normally connected to said cylinder, said device comprising a body having an inlet to which said air line is connected and a separate, oppositely disposed outlet connected by a nipple to said brake cylinder, said body having a cylindrical well having a bottom and spaced from each of said inlet and outlet, a first passage leading from said inlet to the center of said well bottom and a second passage leading from said well bottom, at a point spaced from the center thereof, to said outlet; a cylindrical housing attached to said body at said well and enclosing combustible material; means, including an electrical ignition plug mounted on and communicating with the interior of said housing, for igniting said combustible material; a sealing plug having a cylindrical end normally spaced from the end of said first passage at said well bottom but movable axially by gaseous pressure developed by ignition of said combustible material toward and into sealing relation with said end of said first passage, said cylindrical end of said plug being smaller than said well so as to permit flow of the gaseous products of combustion of said material through said second passage, said sealing plug being formed of resilient material and provided with a laterally extending flange at the end opposite said cylindrical end, said flange engaging the inner periphery of said housing to provide a seal for said combustible material but being adapted to bend and permit the flow of gaseous products of combustion past said flange when said combustible material is ignited; a guide plate having a central aperture for guiding said sealing end of said plug toward said end of said first passage, a flange clamped by said housing in said well and a plurality of apertures between said central aperture and said flange; and an electrical circuit including a wire connected to said ignition plug, a source of current connected to a ground for said ignition plug and a switch mounted in an accessible position for an operator of said truck or the like, opposite sides of said switch being connected to said wire and to said source of current.

9. A device as defined in claim 8, wherein said combustible material is in solid form.

10. A device as defined in claim 8, wherein said combustible material is in granular form.

11. A device as defined in claim 8, wherein said switch is provided with manually operable closing means and a transparent, breakable plate adjacent said closing means.

12. A device as defined in claim 8, including fuse material extending from said ignition plug to a position between said combustible material and said sealing plug.

13. A device as defined in claim 12, wherein said ignition plug is mounted in the side of said housing and includes a space communicating with the interior of said housing and a heating wire forming a coil in said space; and said fuse material is wire-like in form and one end thereof extends into said coil and the remainder thereof extends spirally in a generally flat arrangement.

14. A device as defined in claim 12, wherein said ignition plug is mounted in the side of said housing and includes a space communicating with the interior of said housing and a heating wire forming a coil in said space; and said fuse material comprises a relatively thin block provided with a tongue extending into and around the convolutions of said coil.

15. A device as defined in claim 11, wherein said ignition plug is mounted in the end of said housing and includes a space communicating with the interior of said housing and a heating wire forming a coil in said space; and said fuse material is granular and extends into said plug space, said device being mounted on said brake cylinder so that said end of said housing will be disposed downwardly.

References Cited in the file of this patent

UNITED STATES PATENTS

| | | |
|---|---|---|
| 1,444,984 | Simmon | Feb. 13, 1923 |
| 2,083,654 | Kochmann | June 15, 1937 |
| 2,674,852 | Olman | Apr. 13, 1954 |
| 2,776,734 | Hackett | Jan. 8, 1957 |

FOREIGN PATENTS

| | | |
|---|---|---|
| 548,727 | Great Britain | Oct. 22, 1942 |